United States Patent
Lasseter et al.

(10) Patent No.: US 7,787,272 B2
(45) Date of Patent: Aug. 31, 2010

(54) INVERTER BASED STORAGE IN DYNAMIC DISTRIBUTION SYSTEMS INCLUDING DISTRIBUTED ENERGY RESOURCES

(75) Inventors: Robert H. Lasseter, Madison, WI (US); Paolo Piagi, Woburn, MA (US)

(73) Assignee: Wisconsin Alumni Research Foundation, Madison, WI (US)

( * ) Notice: Subject to any disclaimer, the term of this patent is extended or adjusted under 35 U.S.C. 154(b) by 540 days.

(21) Appl. No.: 11/681,024

(22) Filed: Mar. 1, 2007

(65) Prior Publication Data

US 2008/0212343 A1    Sep. 4, 2008

(51) Int. Cl.
H02M 7/66 (2006.01)
H02M 7/68 (2006.01)
H02M 7/72 (2006.01)
H02M 7/757 (2006.01)

(52) U.S. Cl. .......................................... 363/98; 363/79

(58) Field of Classification Search .................. 363/15, 363/19, 21.03, 21.15, 21.16, 39, 118, 74, 363/78, 79, 95, 97, 98; 318/798
See application file for complete search history.

(56) References Cited

U.S. PATENT DOCUMENTS

| | | | |
|---|---|---|---|
| 4,096,394 A | 6/1978 | Ullmann et al. | |
| 4,315,163 A | 2/1982 | Bienville | |
| 5,041,959 A | 8/1991 | Walker | |
| 5,198,698 A | 3/1993 | Paul et al. | |
| 5,329,222 A | 7/1994 | Gyugyi et al. | |
| 5,536,976 A | 7/1996 | Churchill | |

(Continued)

FOREIGN PATENT DOCUMENTS

EP    1286444    2/2003

(Continued)

OTHER PUBLICATIONS

Lasseter, Robert, Kevin Tomsovic, and Paolo Piagi. "Scenarios for Distributed Technology Applications with Steady State and Dynamic Models of Loads and Micro-Sources," Consortium for Electric Reliability Technology Solutions. Apr. 14, 2000.

(Continued)

*Primary Examiner*—Gary L Laxton
*Assistant Examiner*—Nusrat J Quddus
(74) *Attorney, Agent, or Firm*—Bell & Manning, LLC

(57) ABSTRACT

A microsource is provided, which includes an inverter, an energy storage device, and a controller. The controller calculates a maximum frequency change for the inverter based on a first comparison between a first power set point and a measured power from the inverter. The first power set point is defined based on a charge level of the energy storage device. A minimum frequency change for the inverter is calculated based on a second comparison between a second power set point and the measured power from the inverter. An operating frequency for the inverter is calculated based on a third comparison between a power set point and a measured power flow. A requested frequency for the inverter is calculated by combining the maximum frequency change, the minimum frequency change, and the operating frequency. The requested frequency is integrated to determine a phase angle of a voltage of the inverter to control a frequency of an output power of the inverter.

21 Claims, 11 Drawing Sheets

U.S. PATENT DOCUMENTS

| | | | |
|---|---|---|---|
| 5,559,704 | A | 9/1996 | Vanek et al. |
| 5,563,802 | A | 10/1996 | Plahn et al. |
| 5,596,492 | A | 1/1997 | Divan et al. |
| 5,614,770 | A | 3/1997 | Suelzle |
| 5,710,699 | A | 1/1998 | King et al. |
| 5,745,356 | A | 4/1998 | Tassitino et al. |
| 5,811,960 | A | 9/1998 | Van Sickle et al. |
| 6,014,015 | A | 1/2000 | Thorne et al. |
| 6,111,764 | A | 8/2000 | Atou et al. |
| 6,134,124 | A | 10/2000 | Jungreis et al. |
| 6,172,432 | B1 | 1/2001 | Schnackenberg et al. |
| 6,188,205 | B1 | 2/2001 | Tanimoto et al. |
| 6,219,591 | B1 | 4/2001 | Vu et al. |
| 6,219,623 | B1 | 4/2001 | Wills |
| 6,249,411 | B1 | 6/2001 | Hemena et al. |
| 6,252,310 | B1 | 6/2001 | Wilhelm |
| 6,285,917 | B1 | 9/2001 | Sekiguchi et al. |
| 6,288,456 | B1 | 9/2001 | Cratty |
| 6,347,027 | B1 | 2/2002 | Nelson et al. |
| 6,356,471 | B1 | 3/2002 | Fang |
| 6,359,423 | B1 | 3/2002 | Noro |
| 6,465,910 | B2 | 10/2002 | Young et al. |
| 6,693,809 | B2 | 2/2004 | Engler |
| 6,787,933 | B2 | 9/2004 | Claude et al. |
| 6,812,586 | B2 | 11/2004 | Wacknow et al. |
| 6,870,279 | B2 | 3/2005 | Gilbreth et al. |
| 7,042,110 | B2 | 5/2006 | Mikhail et al. |
| 7,069,673 | B2 | 7/2006 | Kagoshima et al. |
| 7,116,010 | B2 | 10/2006 | Lasseter et al. |
| 2003/0036806 | A1 | 2/2003 | Schienbein et al. |
| 2004/0051387 | A1* | 3/2004 | Lasseter et al. ............... 307/80 |
| 2004/0080165 | A1 | 4/2004 | Geis et al. |
| 2006/0208574 | A1 | 9/2006 | Lasseter et al. |

FOREIGN PATENT DOCUMENTS

| | | |
|---|---|---|
| EP | 1383224 | 1/2004 |

OTHER PUBLICATIONS

DOE News, The DER Weekly, vol. 2, No. 10, pp. 1-4. Mar. 9, 2001.

Lasseter, Robert, et al. "White Paper on Integration of Distributed Energy Resources the CERTS MicroGrid Concept," Consortium for Electric Reliability Technology Solutions, pp. 1-27. Apr. 2002.

Lasseter, Robert, "MicroGrids," IEEE, No. 0-7803-7322-7, pp. 305-308. Jul. 2002.

PCT International Search Report for PCT/US2008/054566 dated Jul. 11, 2008.

PCT International Search Report for PCT/US2008/054572 dated Jul. 11, 2008.

PCT International Search Report for PCT/US2008/054577 dated Jul. 11, 2008.

Son, Kwang, et al., "A Newton-Type Current Injection Model of UPFC for Studying Low-Frequency Oscillations," Power Engineering Society General Meeting, IEEE vol. 4, Jul. 13-17, 2003. (Abstract).

Notice of Allowance issued in U.S. Appl. No. 11/681,014 mailed July 30, 2009.

* cited by examiner

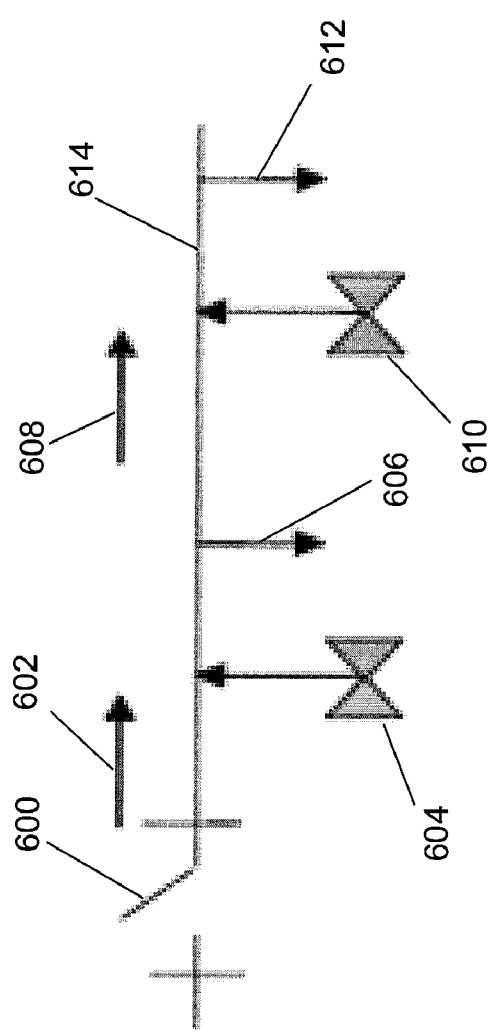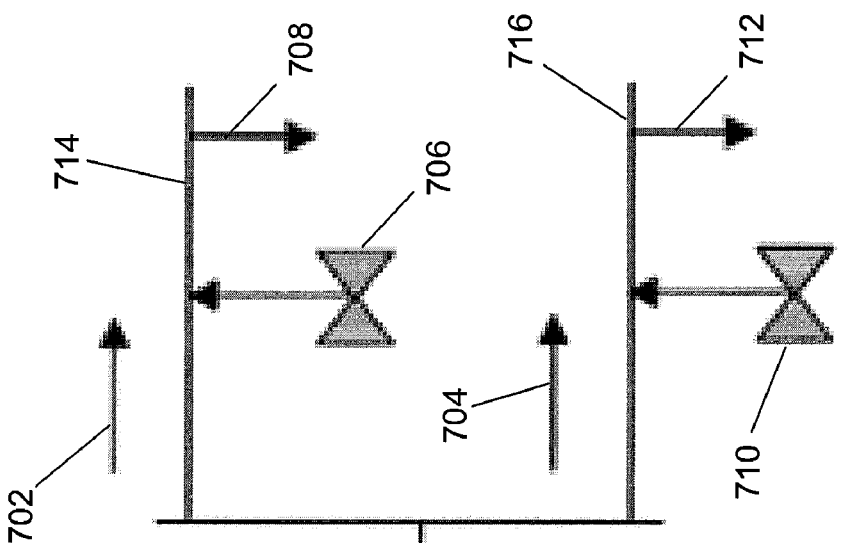
Fig. 6
Fig. 7

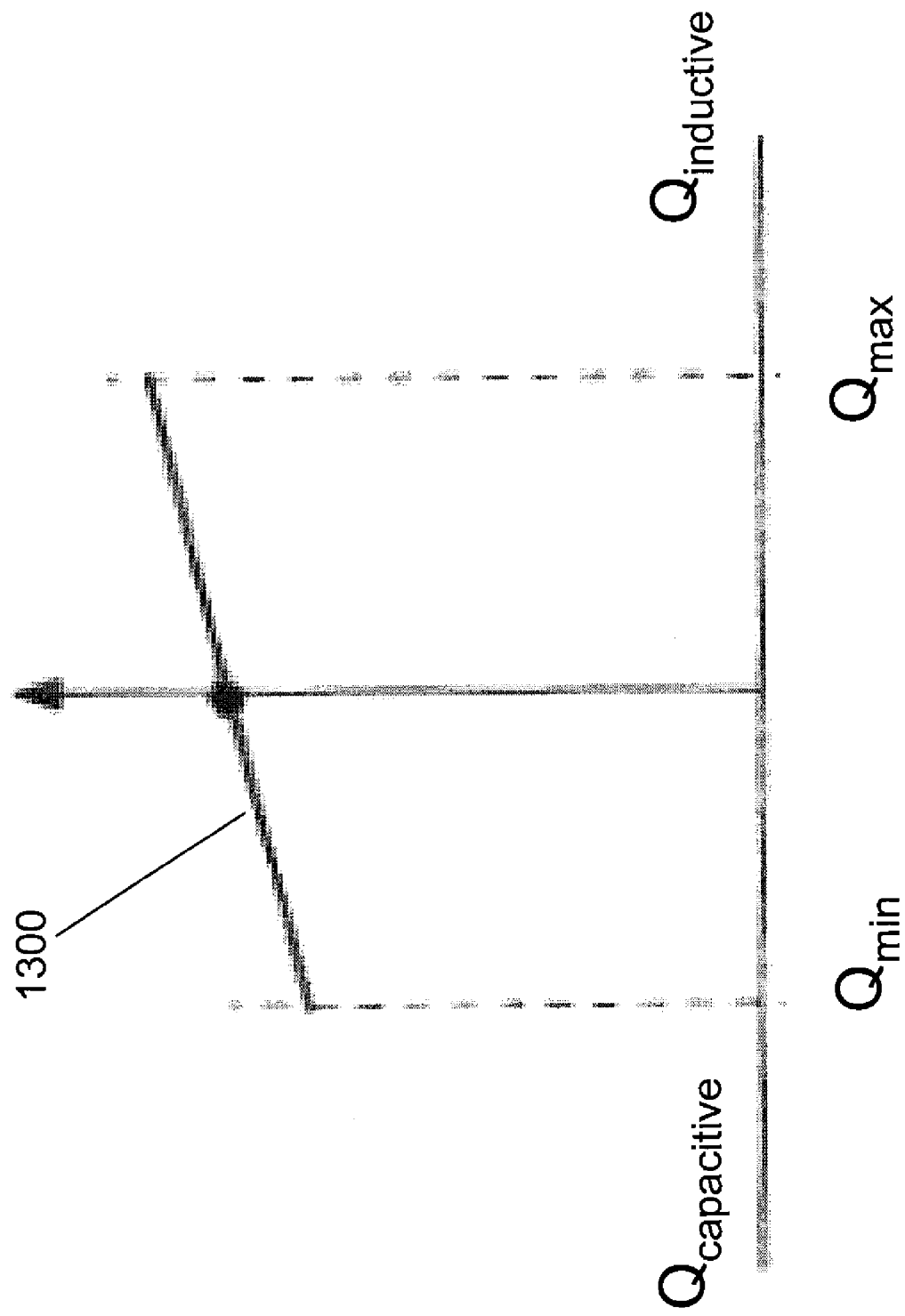

INVERTER BASED STORAGE IN DYNAMIC DISTRIBUTION SYSTEMS INCLUDING DISTRIBUTED ENERGY RESOURCES

REFERENCE TO GOVERNMENT RIGHTS

This invention was made with United States government support awarded by the following agencies: National Science Foundation, Electrical & Communications System Div., Award No. 0078522. The United States government has certain rights in this invention.

FIELD

The field of the disclosure relates generally to power systems. More specifically, the disclosure relates to energy storage usage in an inverter based distributed energy resource included in a dynamic distribution system.

BACKGROUND

The demand for electrical power continues to grow worldwide. At the same time, aging transmission and distribution systems remain subject to occasional failures. Massive failures covering wide geographical areas and affecting millions of people have occurred, even in the United States, which has historically enjoyed a relatively reliable electrical power system. Problems with the capacity and reliability of the public power grid have driven the development of distributed energy resources (DER), small independent power generation systems which may be owned by, and located near, consumers of electrical power. DERs include a wide range of technologies, such as internal combustion engines, gas turbines, micro-turbines, photovoltaic cells, fuel cells, wind-power, storage systems, etc.

DERs can provide reliable power in critical applications as a backup to the primary electrical supply. For example, an interruption of power to a hospital can have life-threatening consequences. Similarly, when power to a factory is interrupted, productivity is lost, materials in process are wasted, and other costs are incurred in association with restarting the production line. Additionally, power from a DER can be provided to the main power grid to reduce energy price peaks by arbitraging energy price differentials. Geographically distributed sources of power, such as wind, solar, or hydroelectric power, may be too limited or intermittent to be used as the basis for a centralized power plant. However, these types of power sources can supplement or replace conventional power sources when the main power grid is available and can provide a backup when the main power grid is unavailable to increase energy efficiency and to reduce pollution and greenhouse gas emissions through the use of combined heat and power DER systems. DERs also can be used to meet load growth requirements and to enhance the robustness of the transmission system with a minimal addition of new lines.

Generally speaking, DERs can include two broad categories of electrical power sources: Direct current (DC) sources, such as fuel cells, solar cells, and batteries; and high-frequency analog current (AC) sources, such as micro-turbines and wind turbines. Both types of sources are typically used to provide an intermediate DC voltage, that may be produced directly by DC sources, and produced indirectly from AC sources, for example by rectification. In both types of sources, the intermediate DC voltage is subsequently converted to AC voltage or current at the required frequency, amplitude, and phase angle for use. In most cases, the conversion from the intermediate DC voltage to the usable AC voltage is performed by a voltage inverter that can rapidly control the magnitude and phase of its output voltage.

DERs may be designed to operate in one of two modes: (1) "isolation" or "island" mode, wherein the DER is isolated from the main grid, and (2) normal "grid" mode, wherein the DER is connected to the main grid to either import power from or export power to the main grid. Smooth and efficient transition between the two modes is a necessity to effectively integrate DERs into the distribution system without harming the integrity of the remaining system. A centralized electrical power utility is in a position to monitor and coordinate the production and distribution of power from multiple generators. In contrast, DERs may include independent producers of power who have limited awareness or communication with each other. Even if the independent producers of power are able to communicate with each other, there may not be an effective way to ensure that they cooperate. As a result, to realize the potential of integrating DERs into the distribution system, the integration should not depend on complex, centralized command and control systems. Thus, for effective integration of DERs into the distribution system, a method and a system capable of responding to events in a distribution system using only local information is needed.

Effective integration of DERs into the distribution system also benefits from fast acting energy sources, such as storage, which provide the energy required by the loads until slower sources ramp-up their energy output when a DER isolates from the distribution system. Storage sources also allow the exploitation of energy price differentials by charging of the DER when power costs are low (i.e. at night) and discharging of the DER when power costs are high (i.e. during peak loads). Additionally, storage within an intermittent renewable such as a wind and/or a solar system can discharge when the renewable energy is low (no wind or sun) and charge when there is excess renewable energy (high wind at 2 a.m.). Thus, what is further needed is a method and a system capable of effective utilization of power and/or energy storage resources within a DER system.

SUMMARY

A method and a system for effective utilization of power and/or energy storage resources within a DER system are provided in an exemplary embodiment. Each active component of the distribution system reacts to local information such as a voltage, a current, and a frequency to correctly change its operating point.

In an exemplary embodiment, a controller for controlling a charge and/or a discharge of an energy storage device used in a distributed energy resource is provided. The controller calculates a maximum frequency change for the inverter based on a first comparison between a first power set point and a measured power from the inverter. The first power set point is defined based on a charge level of the energy storage device. A minimum frequency change for the inverter is calculated based on a second comparison between a second power set point and the measured power from the inverter. An operating frequency for the inverter is calculated based on a third comparison between a power set point and a measured power flow. A requested frequency for the inverter is calculated by combining the calculated maximum frequency change, the calculated minimum frequency change, and the calculated operating frequency. The calculated requested frequency is integrated to determine a phase angle of a voltage of the inverter to control a frequency of an output power of the inverter.

In an exemplary embodiment, a microsource is provided. The microsource includes an inverter, an energy storage device operably coupled with the inverter, and a controller operably coupled with the energy storage device and the inverter. The controller calculates a maximum frequency change for the inverter based on a first comparison between a first power set point and a measured power from the inverter. The first power set point is defined based on a charge level of the energy storage device. A minimum frequency change for the inverter is calculated based on a second comparison between a second power set point and the measured power from the inverter. An operating frequency for the inverter is calculated based on a third comparison between a power set point and a measured power flow. A requested frequency for the inverter is calculated by combining the calculated maximum frequency change, the calculated minimum frequency change, and the calculated operating frequency. The calculated requested frequency is integrated to determine a phase angle of a voltage of the inverter to control a frequency of an output power of the inverter.

In another exemplary embodiment, a method of controlling a charge and/or a discharge of an energy storage device used in a distributed energy resource is provided. A maximum frequency change for the inverter is calculated based on a first comparison between a first power set point and a measured power from the inverter. The first power set point is defined based on a charge level of the energy storage device. A second frequency change for the inverter is calculated based on a second comparison between a minimum power set point and the measured power from the inverter. An operating frequency for the inverter is calculated based on a third comparison between a power set point and a measured power flow. A requested frequency for the inverter is calculated by combining the calculated maximum frequency change, the calculated minimum frequency change, and the calculated operating frequency. The calculated requested frequency is integrated to determine a phase angle of a voltage of the inverter to control a frequency of an output power of the inverter.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals denote like elements.

FIG. 6 is a diagram of two microsources used in a single zone in accordance with an exemplary embodiment.

FIG. 7 is a diagram of two microsources used in multiple zones in accordance with an exemplary embodiment.

FIG. 13 is a graph of an exemplary voltage droop regulation characteristic for a voltage regulator in accordance with an exemplary embodiment.

DETAILED DESCRIPTION

Figure 1:
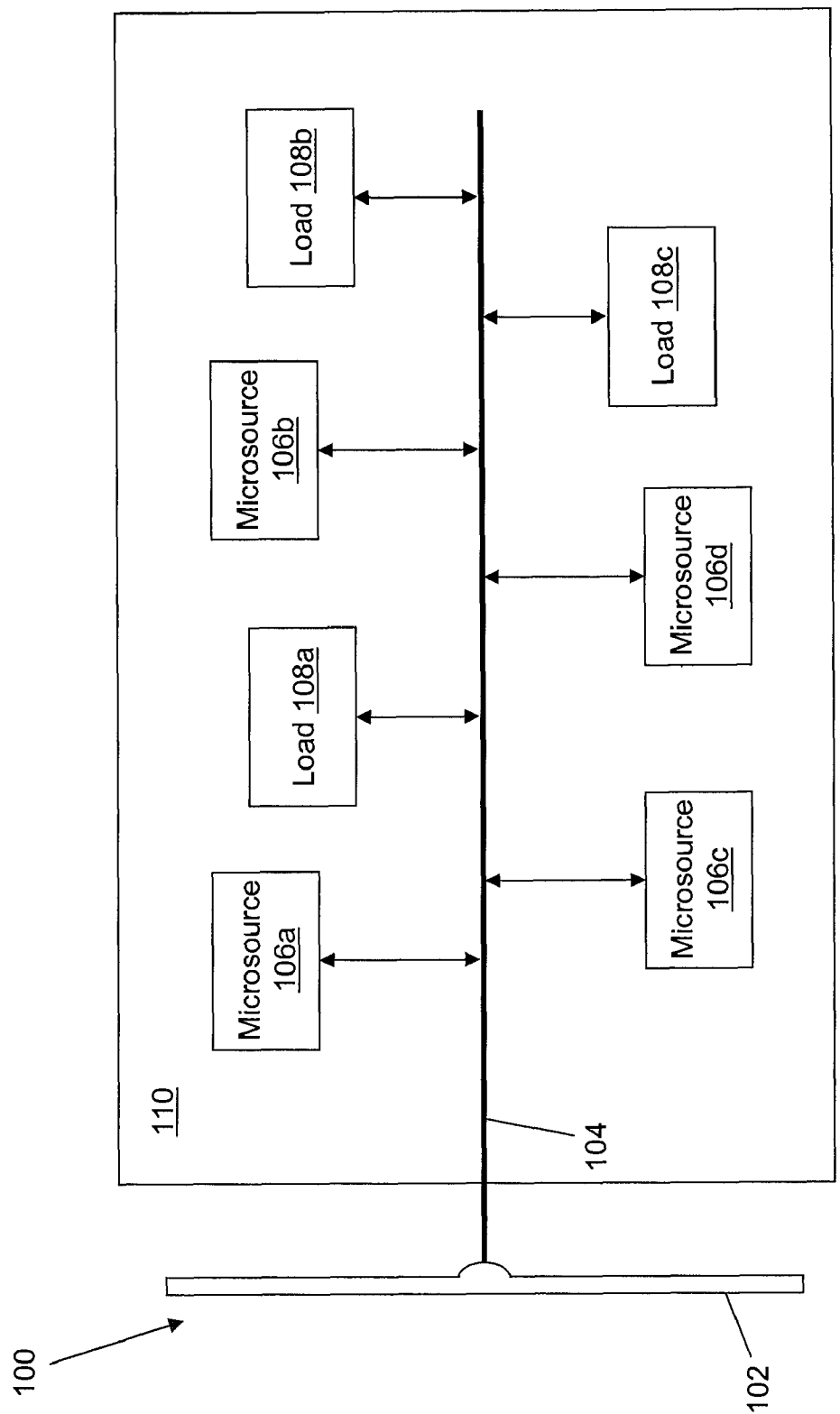
FIG. 1 depicts a block diagram of a distributed energy resource system in accordance with an exemplary embodiment.

With reference to FIG. 1, a distributed energy resource (DER) system 100 is shown in accordance with an exemplary embodiment. Such an exemplary system is described, for example, in U.S. Pat. No. 7,116,010 and/or in U.S. Patent Publication No. 2006/000208574, the contents of which are incorporated by reference. Where the disclosure of the present application is limited by or in conflict with the disclosures of U.S. Pat. No. 7,116,010 and U.S. Patent Publication No. 2006/000208574, the disclosure of the present application controls. DER system 100 may include a utility supply 102 connected to a feeder line 104 that interconnects one or more microsource systems 106a, 106b, 106c, and 106d and one or more loads 108a, 108b, and 108c. DER system 100 may include a plurality of feeder lines. Feeder line 104, the one or more microsource systems 106a, 106b, 106c, and 106d, and the one or more loads 108a, 108b, and 108c can form a microgrid 110. Utility supply 102 can connect microgrid 110 to other similar microgrids distributed throughout DER system 100. A microsource system can include exemplary microsource power sources, power storage, and power controllers. The power source can be, for example, a fuel cell, hydroelectric generator, photovoltaic array, windmill, microturbine, etc. The power storage, if present, can be, for example, a battery or flywheel.

Feeder line 104 may include one or more interface switches. An exemplary interface switch is described, for example, in U.S. patent application Ser. No. 11/266,976, filed Nov. 4, 2005 and entitled INTERFACE SWITCH FOR DISTRIBUTED ENERGY RESOURCES, the contents of which are incorporated by reference. Where the disclosure of the present application is limited by or in conflict with the disclosure of U.S. patent application Ser. No. 11/266,976, the disclosure of the present application controls. The interface switch, if used, can be positioned between feeder line 104 and utility supply 102 so that microgrid 110 can be isolated from utility supply 102. When microgrid 110 is isolated from utility supply 102, the microgrid 110 is said to be operating in "island mode". When microgrid 110 is connected to the utility supply 110, the microgrid 110 is said to be operating in "grid mode". When DER system 100 is connected to the grid, the one or more loads 108a, 108b, and 108c may receive power from both the grid and local sources, depending on the current situational demands.

When a microsource or microgrid operates in island mode, load tracking problems can arise because typical power sources used in microsources, such as microturbines or fuel cells, tend to respond slowly, with time constants ranging from 10 to 200 seconds. Additionally, these types of power sources may be inertialess. Conventional utility power systems store energy in the inertia of the spinning mass of a generator. When a new load comes online, the initial energy balance can be met by the system's inertia, which results in a slight reduction in system frequency. Because power sources in microsources may be inertialess, a microsource may include power storage to ensure initial energy balance when loads are added during island mode.

Each microsource system 106a, 106b, 106c, and 106d preferably includes a microsource controller. The microsource controller responds to events using local information to respond to voltage drops, faults, blackouts, etc. and to switch to island operation mode as needed. The microsource controller controls the change in the output power of the system components as they change from a dispatched power mode to one in which frequency is controlled and load following is provided. Control schemes for a power controller in DER system 100 can be classified into one of three broad classes: unit power control, zone power control, and a mixed system using both unit power control and zone power control. Using a unit power controller, load changes are matched by a corresponding power injection from the utility because a microsource holds its injection to a set point $P_0$. During island mode, the microsource matches the power demand as loads change. Each microsource system 106a, 106b, 106c, and 106d regulates the voltage magnitude at its connection point and the injected power using either a variable slope method or a fixed slope method.

Using a zone power controller, power flow in zones is controlled instead of controlling the power flow from each microsource. Each microsource system 106a, 106b, 106c, and 106d regulates the voltage magnitude at its connection point and the power that is flowing in the feeder. Using a zone power controller, the microsource systems 106a, 106b, 106c, and 106d pick-up extra load demands, and as a result, show a constant load to the utility grid. In this case, DER system 100 becomes a true dispatchable load as seen from the utility side supporting demand-side management arrangements. To reduce confusion, the symbol, F, is used for power flow in a zone and the symbol, P, is used for the power output from a microsource. When connected to the grid, load changes are matched by a different power injection from the microsource because the controller holds the flow of power coming from the grid, $F_{line}$, to a constant value. During island mode, all of the microsources participate in matching the power demand as loads change.

Figure 2:
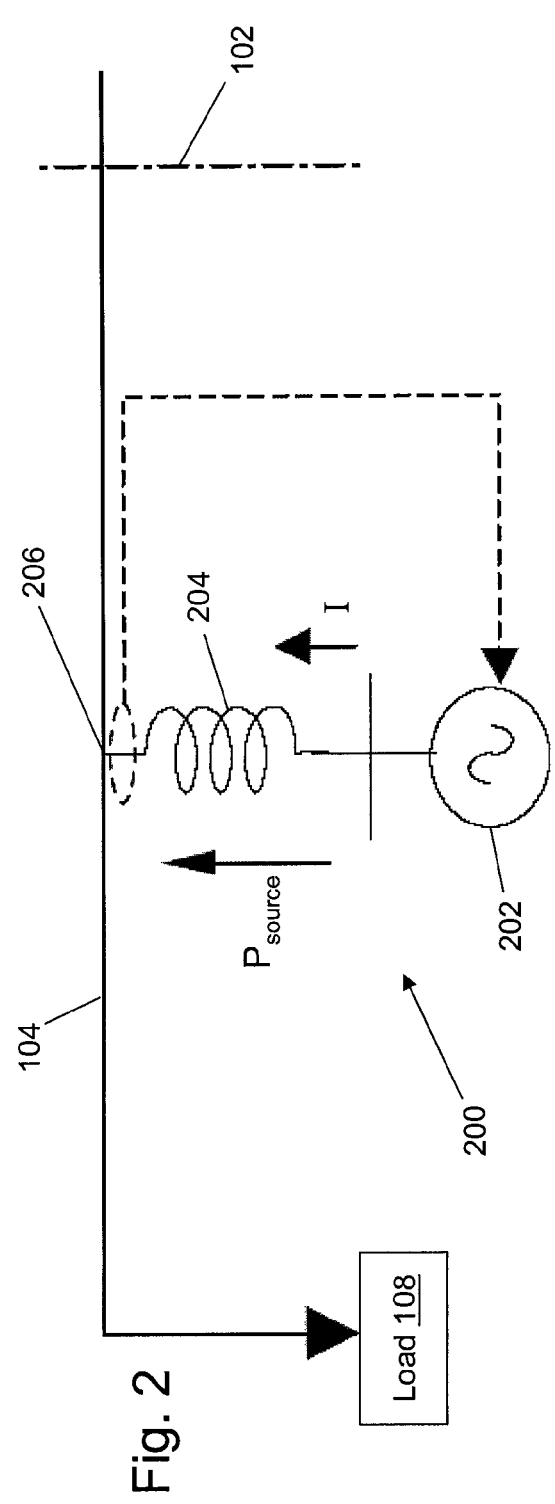
FIG. 2 is a diagram of a microgrid that includes a microsource implementing a unit power control scheme in accordance with an exemplary embodiment.

With reference to FIG. 2, a diagram of a microgrid 200 is shown in accordance with an exemplary embodiment using a unit power controller. Microgrid 200 may include a microsource 202 and a load 108. Microsource 202 may be connected to feeder line 104 by an inductor 204. An interface switch may be provided, for example, in feeder line 104. The interface switch can be opened to isolate microgrid 200 from the rest of DER system 100 and can be closed to connect microgrid 200 to the rest of DER system 100. Microsource 202 may include a controller capable of measuring a current through inductor 204 and of measuring a system voltage at a point 206 in feeder line 104 where inductor 204 joins feeder line 104.

Figure 3:
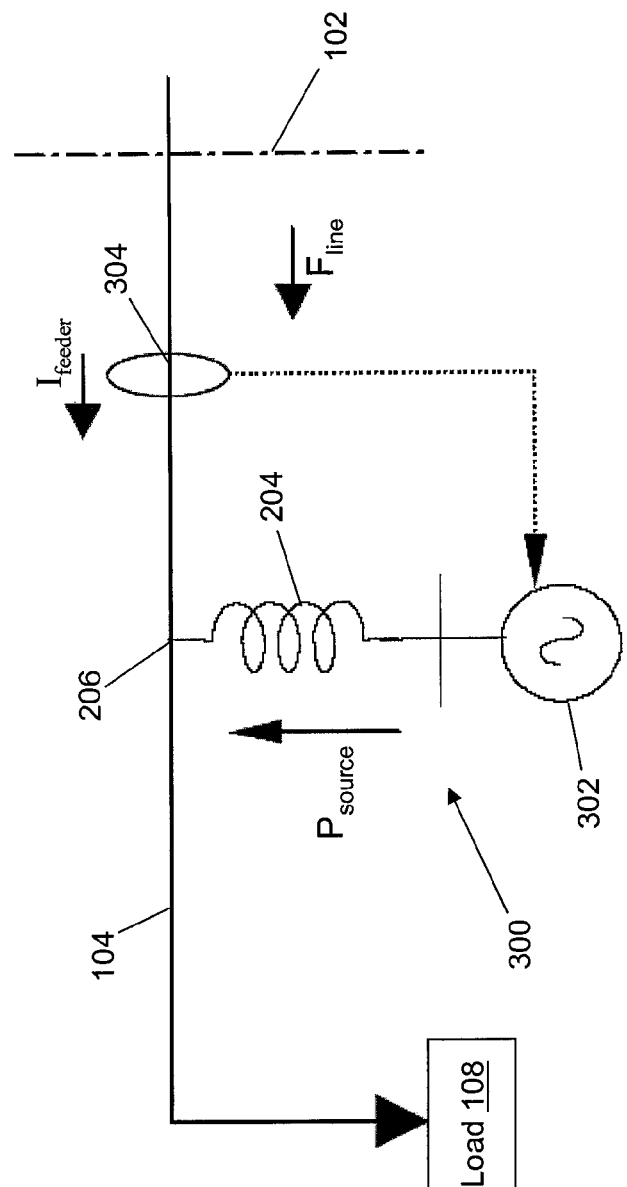
FIG. 3 is a diagram of a microgrid that includes a microsource implementing a zone power control scheme in accordance with an exemplary embodiment.

With reference to FIG. 3, a diagram of a microgrid 300 is shown in accordance with an exemplary embodiment using a zone power controller. Microgrid 300 may include a microsource 302 and load 108. Microsource 302 may be connected to feeder line 104 by inductor 204. An interface switch may be provided, for example, in feeder line 104. The interface switch can be opened to isolate microgrid 300 from the rest of DER system 100 and can be closed to connect microgrid 300 to the rest of DER system 100. Microsource 302 may include a controller capable of measuring a current at a point 304 in feeder line 104 between utility supply 102 and inductor 204 and of measuring a system voltage at a point 206 in feeder line 104 where inductor 204 joins feeder line 104.

Figure 4:
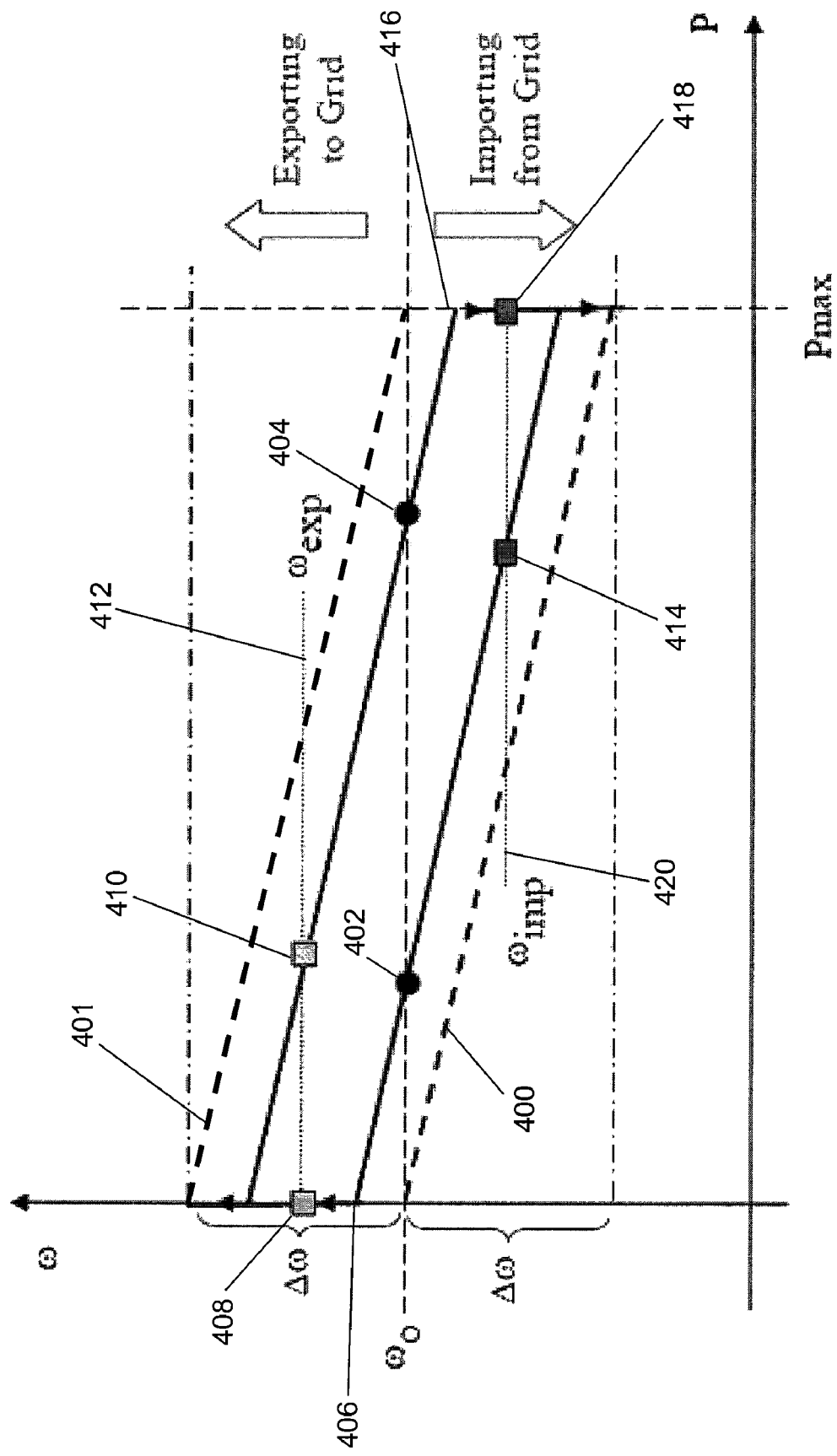
FIG. 4 is a graph depicting the relationship between steady state unit power vs. frequency ($P-\omega$) for two exemplary microsources having different loads for use in a unit power control scheme in accordance with an exemplary embodiment.

With reference to FIG. 4, a graph depicting the relationship between steady state unit power and frequency (P-ω)using a fixed minimum slope method and unit power control is shown in accordance with an exemplary embodiment. FIG. 4 shows steady state characteristics. The response may deviate from the characteristic during a transition period. Two exemplary microsources included in the microgrid are shown. The microsources have different power set points though this is not required. A first microsource has a first power set point 402. A second microsource has a second power set point 404. First power set point 402 and second power set point 404 are the amount of power injected by each source when connected to the grid at a system frequency $\omega_o$. A constant slope $$m = -\frac{\Delta\omega}{P_{\max}}$$

allows power to change between P=0 and $P=P_{max}$ as frequency changes over Δω. A lower bounding line 400 extends from P=0 to $P=P_{max}$ with a starting frequency of $\omega_o$. An upper bounding line 401 extends from P=0 to $P=P_{max}$ with a starting frequency of $\omega_o+\Delta\omega$. Because a constant slope is used by the controller, the response lines are all parallel to and extend between lower bounding line 400 and upper bounding line 401.

Movement along the lines of constant slope m in response to a transition to island mode depends on whether or not the microgrid is importing power from or exporting power to the grid. If the system was exporting to the grid before islanding, the resulting frequency of $\omega_{exp}$ 412 is greater than the system frequency $\omega_o$. For example, if the system was exporting to the grid before islanding, the second microsource may move from the system frequency $\omega_o$ at second power set point 404 to a third power set point 410 operating at $\omega_{exp}$ 412. The first microsource may shift from the system frequency $\omega_o$ at first power set point 402 to a fourth power set point 406 at P=0. When the P=0 limit is reached, the slope of the characteristic is switched to vertical, as shown by the arrows, to move the first microsource frequency upwards to a fifth power set point 408 operating at $\omega_{exp}$ 412. The specific set points, of course, depend on the local demands and operating points of the microsources. A P=0 limit may not be reached by either microsource.

If the system was importing from the grid before islanding, the resulting frequency of $\omega_{imp}$ 420 will be smaller than the system frequency $\omega_o$. For example, if the system was importing to the grid before islanding, the first microsource may move from the system frequency $\omega_o$ at first power set point 402 to a sixth power set point 414 operating at $\omega_{imp}$ 420. The second microsource may move from the system frequency $\omega_o$ at second power set point 404 to a seventh power set point 416 at P=$P_{max}$. When the P=$P_{max}$ limit is reached, the slope of the characteristic is switched to vertical, as shown by the arrows, to move the second microsource frequency downwards to an eighth power set point 418 operating at $\omega_{imp}$ 420. The minimum and maximum power limits are enforced by switching the characteristic with constant slope to a vertical steady state characteristic when the minimum or maximum power limit is reached. The specific set points, of course, depend on the local demands and operating points of the microsources. A P=$P_{max}$ limit may not be reached by either microsource.

Figure 5:
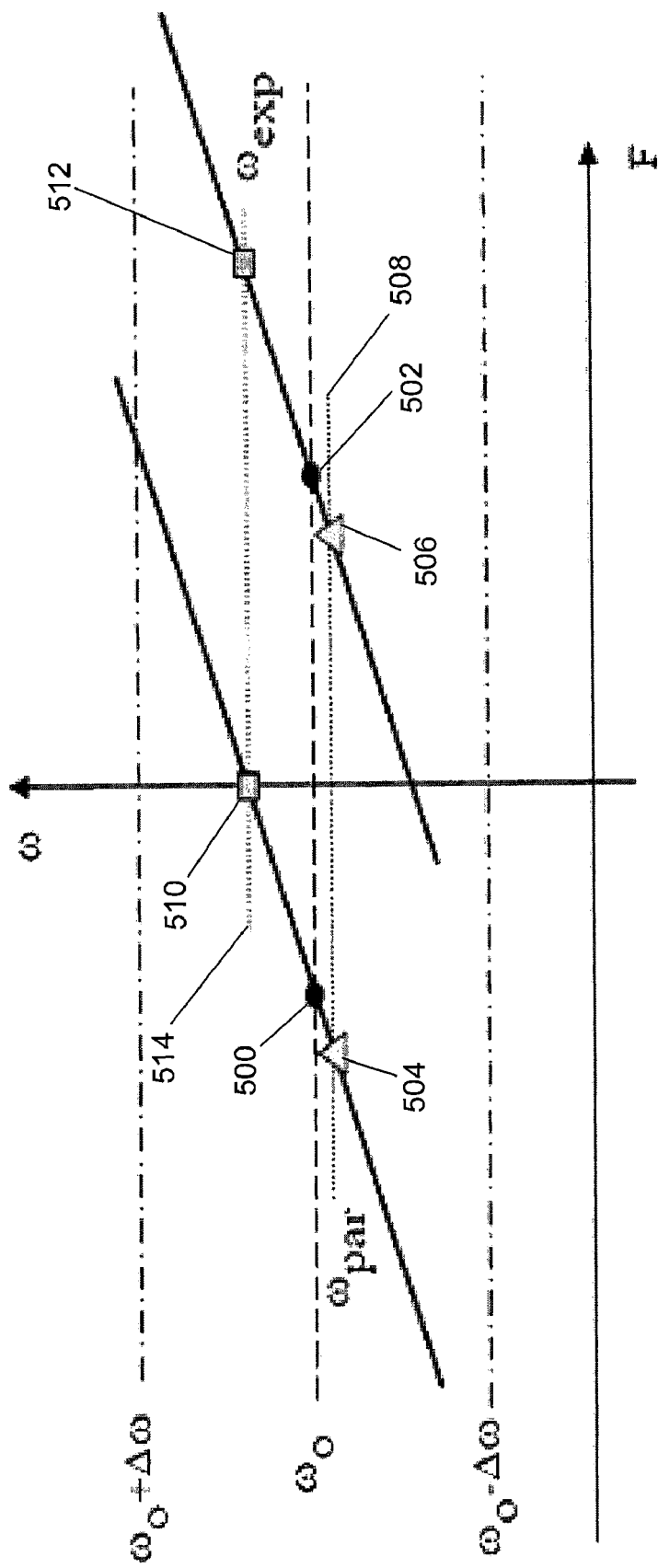
FIG. 5 is a graph depicting the relationship between steady state zone power vs. frequency ($F-\omega$) for two exemplary microsources having different loads for use in a zone power control scheme in accordance with an exemplary embodiment.

With reference to FIG. 5, a graph depicting the relationship between steady state zone power and frequency (F-$\omega$)using a fixed minimum slope method and zone power control is shown in accordance with an exemplary embodiment. Two exemplary microsources are included in the microgrid. The microsources have different power set points. A first microsource has a first flow set point 500. A second microsource has a second flow set point 502. The slope is fixed at the minimum slope m, but has a reversed sign because of the relation between the microsource output power, P, and the zone power flow, F, which can be derived by inspection of FIG. 3 as $F_{line}+P_{source}$=Load. $F_{line}$ is the power (imported means positive) from the rest of DER system 100, and $P_{source}$ is the power injected or absorbed by microsource 302. The power injected or absorbed by microsource 302 is assumed: to be greater than the minimum power output, $P_{min}$, of microsource 302 and less than the maximum power output, $P_{max}$, of microsource 302. For a microsource capable of power injection only, $P_{min}$ is positive or zero, while a bidirectional device capable of both power injection or power storage may have $P_{min}$<0. Load is the overall loading level seen by microsource 302.

During connection with the grid, the flow in the zones tracks the requested values at the system frequency $\omega_o$. When the microgrid transfers to island mode, the two microsources readjust the flow depending on the arrangement of the microsources with respect to each other and utility supply 102. When regulating unit power, the relative location of loads and microsources is irrelevant, but when regulating zone power flow, the relative location of loads and microsources is important. For example, with reference to FIG. 6, a first microsource 604 and a second microsource 610 are arranged in series in a single zone. The use of a single zone is for illustrative purposes only. There can be a greater or a lesser number of microsources in a single zone.

The zone includes a first load 606 and a second load 612 on a local power bus 614 connected by an interface switch 600 to utility supply 102. During a transition to island mode, interface switch 600 opens. As a result, in a zone power control method for the circuit of FIG. 6, a first flow 602 nearest to the utility system is zero in island mode. A second flow 608 may increase to compensate for the first flow 602 transition to zero. Thus, with reference to FIG. 5, first flow 602 moves from the system frequency $\omega_o$, at first flow set point 500 to a third flow set point 510 operating at the frequency $\omega_{exp}$ 514. Second flow 608 moves from the system frequency $\omega_o$ at second flow set point 502 to a fourth power set point 512. As a result, in island mode, the system operates at frequency $\omega_{exp}$ 514 where first flow 602 is zero. Frequency $\omega$exp 514 is larger than the nominal system frequency $\omega_o$ because the system was exporting to the grid (|first flow 602|<|second flow 608|), which is the same behavior seen using unit power control.

With reference to FIG. 7, a first microsource 706 and a second microsource 710 are arranged in parallel in two zones. The use of two zones each with a single microsource is for illustrative purposes only. There can be a greater or a lesser number of microsources in a greater or a lesser number of zones. A first load 708 is located on a first local power bus 714 connected by an interface switch 700 to utility supply 102. A second load 712 is located on a second local power bus 716 connected by interface switch 700 to utility supply 102. A first flow 702 flows through first local power bus 714, and a second flow 704 flows through second local power bus 716. The grid flow is the algebraic sum of first flow 702 and second flow 704. During a transition to island mode, interface switch 700 opens.

In a zone power control method for the arrangement of FIG. 7, during island mode, the frequency takes the value where the sum of the flows is zero. As a result, as shown on FIG. 5, the frequency in island mode is frequency $\omega_{par}$ 508 where F1=−F2. With reference to FIG. 5, first flow 702 moves from the system frequency $\omega_o$ at first flow set point 500 to a fifth flow set point 504 operating at the frequency $\omega_{par}$ 508. Second flow 704 moves from the system frequency $\omega_o$ at second flow set point 502 to a sixth power set point 506 at the frequency $\omega_{par}$ 508.

Figure 8:
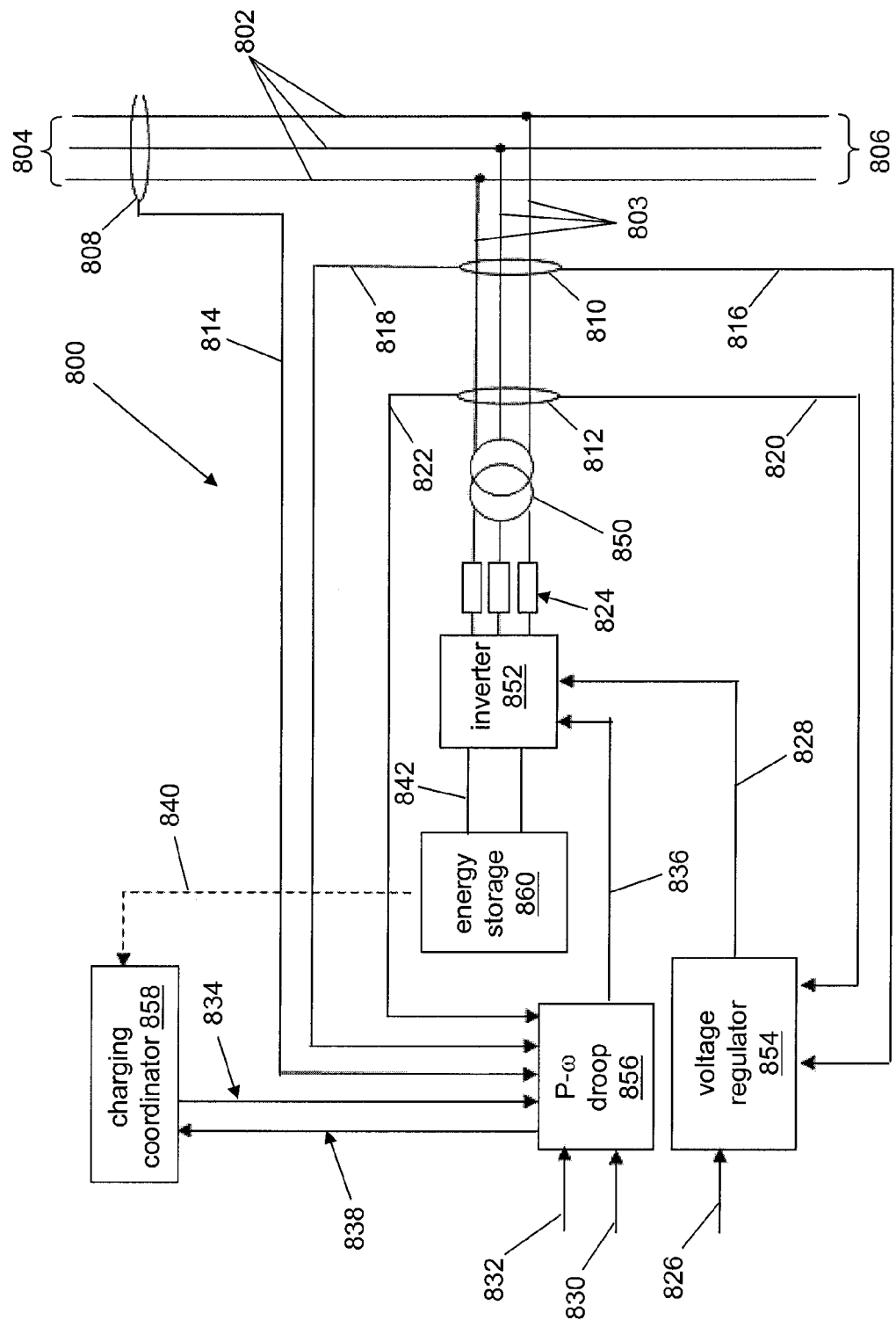
FIG. 8 is a block diagram of an energy storage control system for a distributed energy resource in accordance with an exemplary embodiment.

With reference to FIG. 8, a microsource system 800 including an energy storage device 860 is shown in accordance with an exemplary embodiment. Microsource system 800 and its various components may be implemented in or include hardware, firmware, software, and/or any combination of these methods. Thus, microsource system 800 may include circuitry that can implement the processes indicated in the form of hardware, firmware, and/or a processor executing instructions embodied in software. Microsource system 800 connects to a grid through feeder lines 802. Feeder lines 802 extend toward utility supply 102 in a first direction 804 and away from utility supply 102 in a second direction 806. Microsource system 800 connects to feeder lines 802 through bus lines 803. Microsource system 800 may include an inductor 824, a transformer 850, an inverter 852, a voltage regulator 854, a P-$\omega$ droop controller 856, a charging coordinator 858, and energy storage device 860.

A first sensor 808 measures a feeder current 814 through feeder lines 802 and transmits the measured feeder current to P-$\omega$ droop controller 856. A second sensor 810 measures a feeder bus voltage at the connection point of bus lines 803 with feeder lines 802, transmits the measured feeder bus voltage 816 to voltage regulator 854, and transmits the measured feeder bus voltage 818 to P-$\omega$ droop controller 856. A third sensor 812 measures an inverter current through bus lines 803 between transformer 850 and feeder lines 802, transmits the measured inverter current 820 to voltage regulator 854, and transmits the measured inverter current 822 to P-$\omega$ droop controller 856.

Inverter 852 connects to feeder lines 802 through inductance 824 and transformer 850. Inverter 852 generates an output voltage at a phase angle of $\delta$. In general, the magnitude of $\delta$ is small enough to satisfy the approximation sin($\delta$)~$\delta$. This implies that power is linear relative to $\delta$. Voltage regulator 854 assists in decoupling interactions between DER microsources and includes a voltage vs. reactive power droop controller so that, as the reactive power Q generated by the inverter becomes more capacitive, a local voltage set point 826 is reduced. Conversely, as Q becomes more inductive, local voltage set point 826 is increased. P-$\omega$ droop controller 856 provides the P-$\omega$ and/or F-$\omega$ functions described with reference to FIGS. 4 and 5. P-$\omega$ droop controller 856 additionally provides control over energy storage device 860 using information from charging coordinator 858. Charging coordinator 858 controls the rate of charge and discharge and the charge levels of energy storage device 860 by setting power output limits on P-ω droop controller 856. Energy storage device 860 connects with inverter 852 through a DC bus 842.

Figure 9:
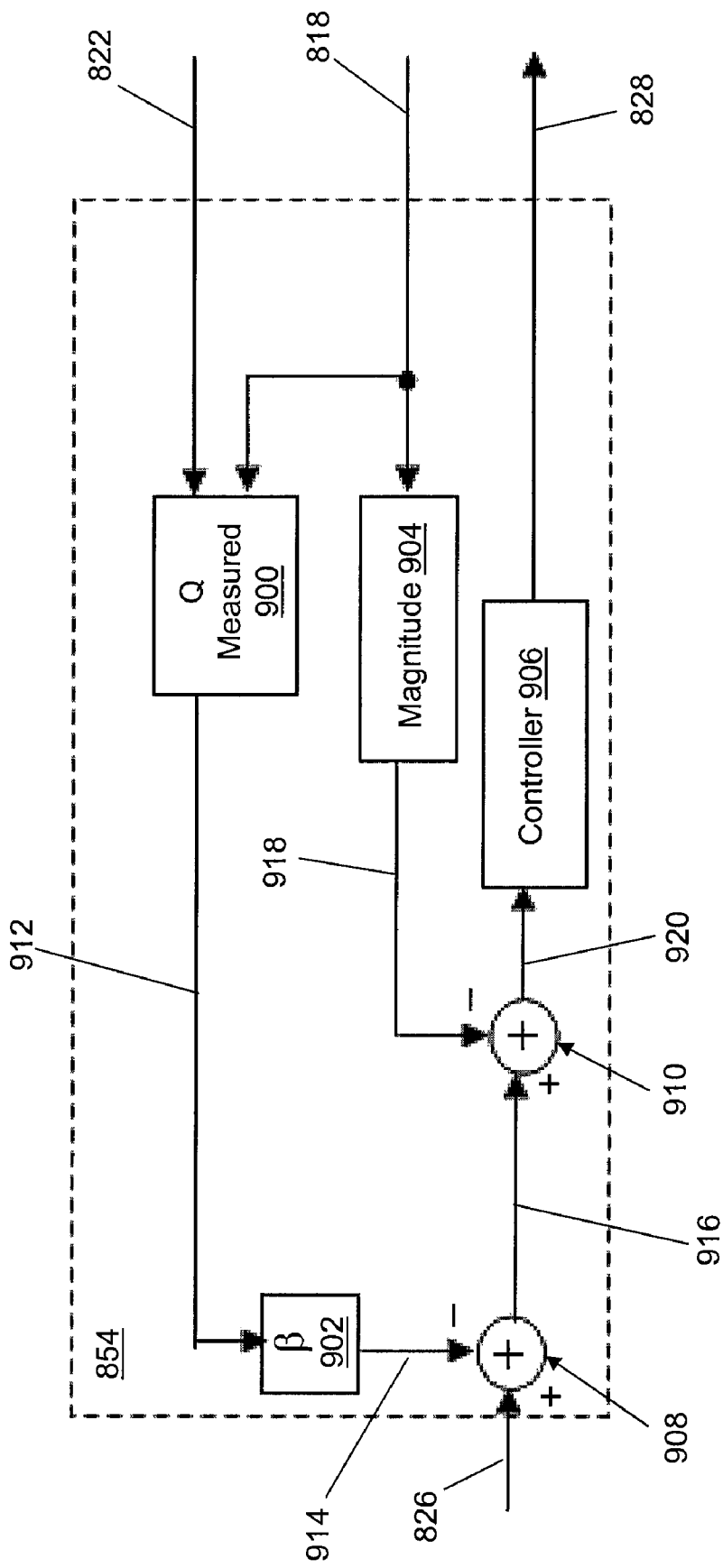
FIG. 9 is a block diagram of a voltage regulator of the energy storage control system of FIG. 8 in accordance with an exemplary embodiment.

With reference to FIG. 9, a block diagram of voltage regulator 854 is shown in accordance with an exemplary embodiment. Voltage regulator 854 may include a Q measured block 900, a β block 902, a magnitude block 904, and a controller 906. The local voltage set point 826 is input to voltage regulator 854. A regulated output voltage 828 is output from voltage regulator 854 and input to inverter 852. Creating an appropriate regulated output voltage at the terminals of inverter 852 regulates the feeder bus voltage. A reactive power 912 is calculated in Q measured block 900 using the measured feeder bus voltage 816 and the measured inverter current 820 as inputs. The calculated reactive power 912 is input to a β block 902, which calculates a modified reactive power 914. The modified reactive power 914 is subtracted from local voltage set point 826 in a summer 908 to define a desired local voltage set point 916 based on a droop constant β defined in β block 902. In an exemplary embodiment, β block 902 is implemented to exhibit a voltage vs. reactive current droop as shown with reference to FIG. 13. Droop constant β is the slope of the droop characteristic line 1300. As reactive power Q becomes more inductive, the desired local voltage set point 916 becomes larger than the local voltage set point 826. As reactive power Q becomes more capacitive, the desired local voltage set point 916 becomes smaller than the local voltage set point 826.

The magnitude 918 of the measured feeder bus voltage 816 is determined in magnitude block 904. The magnitude 918 of the measured feeder bus voltage 816 is compared to the desired local voltage set point 916. For example, a summer 910 subtracts the magnitude 918 of the measured feeder bus voltage 816 from the desired local voltage set point 916. The resulting voltage error 920 is input to controller 906 to generate the regulated output voltage 828. In an exemplary embodiment, controller 906 is a proportional-integral controller.

Figure 10:
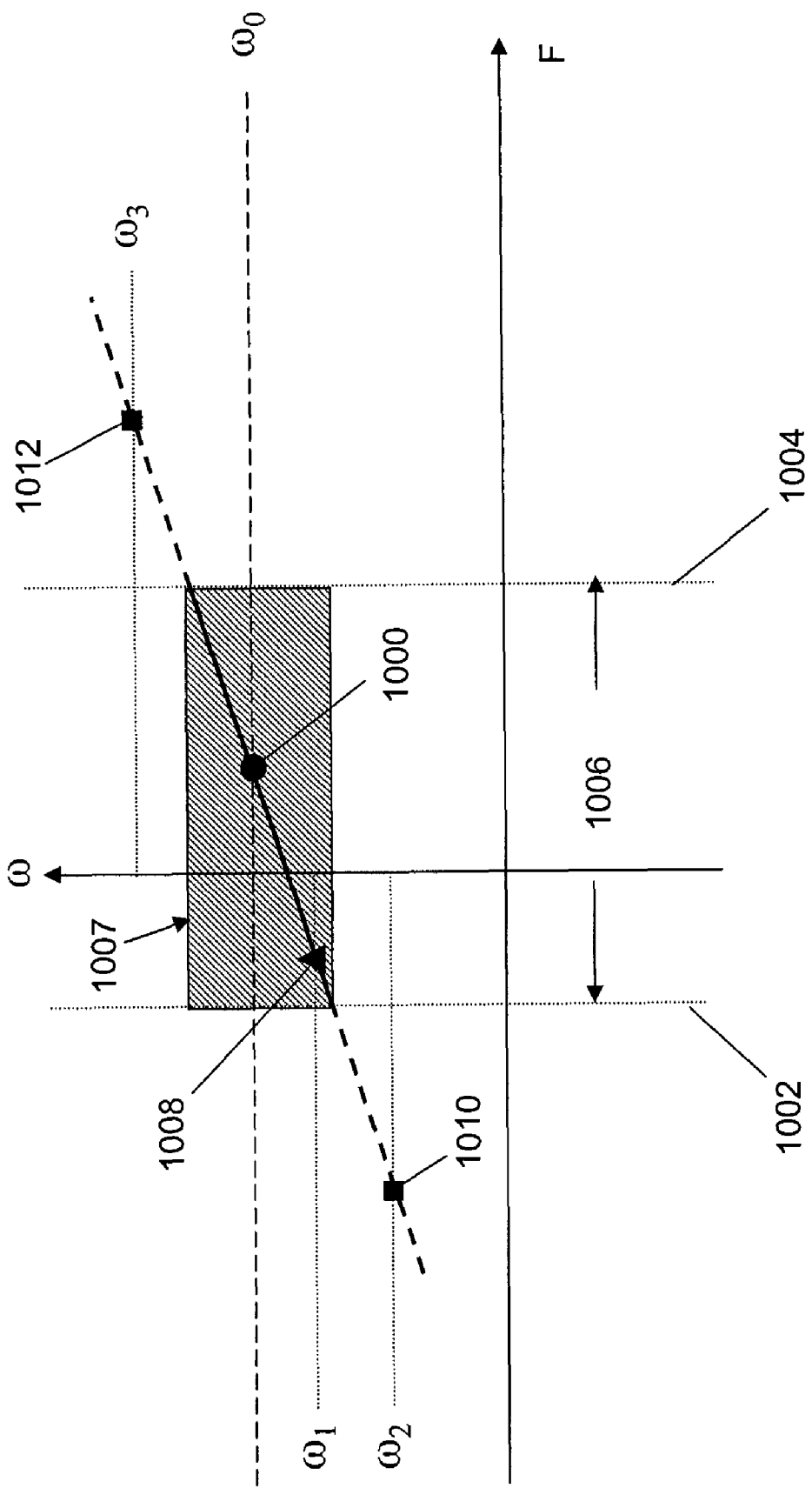
FIG. 10 is a graph depicting a sliding window for applying storage power limits in accordance with an exemplary embodiment.

Energy storage device 860 normally operates in flow control mode with a F-ω characteristic as shown in FIG. 5. In some situations, energy storage device 860 may operate in unit power control mode with a P-ω characteristic as shown in FIG. 4. In either case, the limits of power from energy storage device 860 are used. With reference to FIG. 10, the range of output power, P, available from energy storage device 860 imposes a window 1007 on feeder flow, F, such that $P_{load} - P_{max} < F < P_{load} - P_{min}$, where $P_{load}$ is the load on the system, and $P_{max}$ and $P_{min}$ are the limits on energy storage device 860. When charging, $P_{min}$ is negative. A system F-ω operating point 1000 is defined for the system frequency $\omega_o$. The limits for the feeder flow, F, can be visualized on the F-ω plane as a window whose width 1006 is the difference between $F_{min}$ 1002 and $F_{max}$ 1004 which equals the difference between $P_{max}$ and $P_{min}$. The location of the window on the F-axis depends on the value of $P_{load}$. As $P_{load}$ increases, window 1007 slides to the right on the F-ω plane. Conversely, if the load is reduced, window 1007 slides to the left on the F-ω plane.

An example flow set point 1008 falls within window 1007. Situations are possible that can result in the flow set point falling outside window 1007. For example, load levels while connected to the grid, an incorrect choice for the flow set point, a change in output power of other microsources, and a transfer to island mode all can cause the flow set point to fall outside window 1007. For example, a first flow set point 1010 falls to the left of window 1007. In this situation, $P_{max}$ is exceeded. As another example, a second flow set point 1012 falls to the right of window 1007. In this situation, $P_{min}$ is exceeded. To avoid a flow set point falling outside window 1007, when the flow set point is outside window 1007, the controls reset the flow set point to the closest edge of window 1007.

Figure 11:
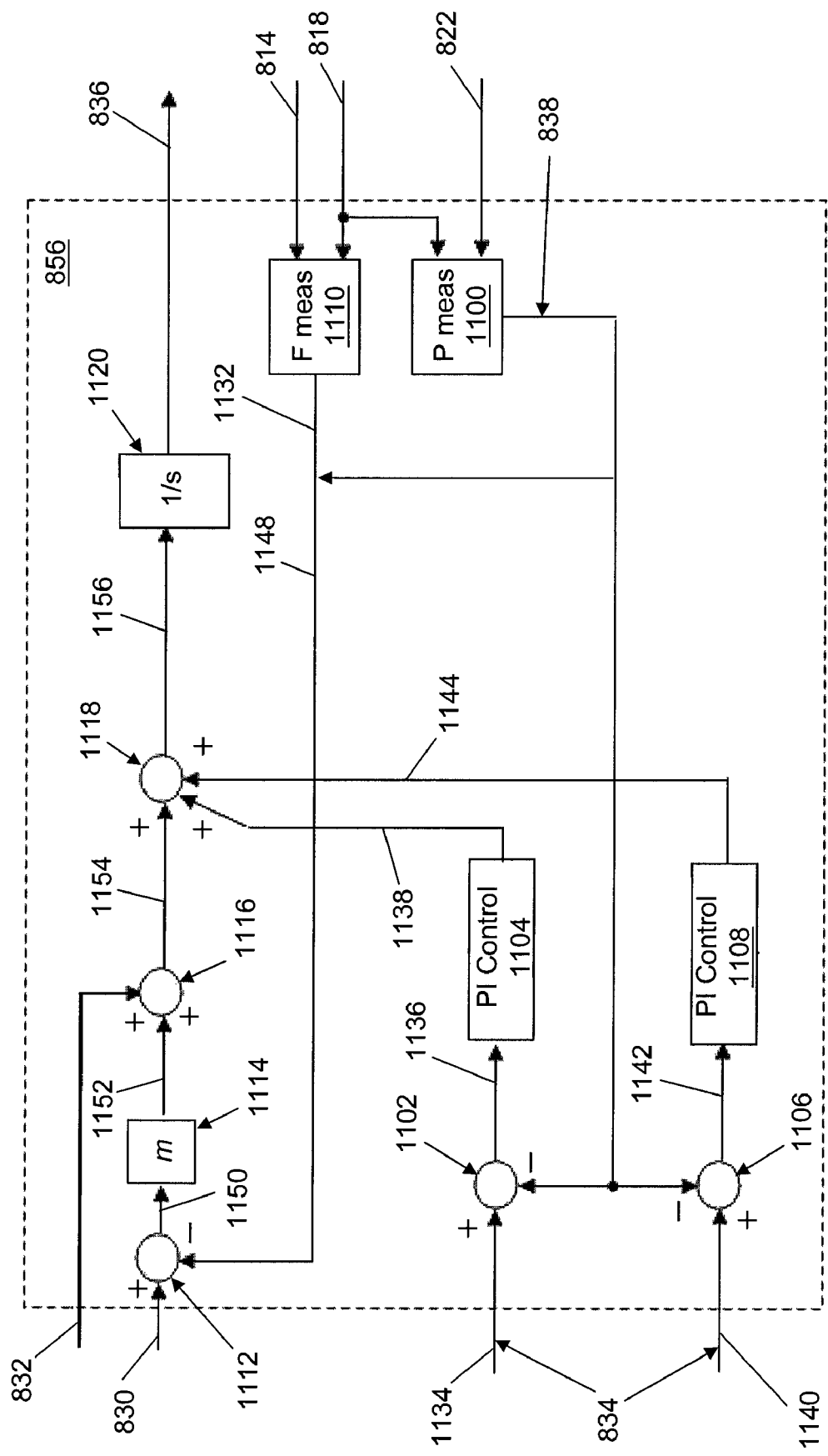
FIG. 11 is a block diagram of a $P-\omega$ droop controller of the energy storage control system of FIG. 8 in accordance with an exemplary embodiment.

With reference to FIG. 11, P-ω droop controller 856 is shown in accordance with an exemplary embodiment. P-ω droop controller 856 may include a P measure block 1100, a first summer 1102, a first proportional-integral (PI) controller 1104, a second summer 1106, a second PI controller 1108, an F measure block 1110, a third summer 1112, a multiplier 1114, a fourth summer 1116, a fifth summer 1118, and an integrator 1120. Inputs of P-ω droop controller 856 include the measured inverter current 822, the measured feeder current 814, and the measured feeder bus voltage 818. With reference to FIG. 8, inputs of P-ω droop controller 856 also include power limits 834 from charging coordinator 858, a power set point 830, and a frequency set point 832. Outputs of P-ω droop controller 856 include an inverter phase angle 836 input to inverter 852 and a $P_{meas}$ 838 input to charging coordinator 858.

With reference to FIG. 11, P-ω droop controller 856 may be used to provide zone power control or unit power control. As a result, power set point 830 may be $P_o$ or $F_o$ and a power flow 1148 input to third summer 1112 may be $F_{meas}$ 1132 or $P_{meas}$ 838. Inputs of F measure block 1110 include the measured feeder current 814 and the measured feeder bus voltage 818. F measure block 1110 outputs $F_{meas}$ 1132. Inputs of P measure block 1100 include the measured inverter current 822 and the measured feeder bus voltage 818. P measure block 1100 outputs $P_{meas}$ 838 to first summer 1102 and second summer 1106. If unit power control is used, P measure block 1100 outputs $P_{meas}$ 838 to third summer 1112. If unit power control is used, the sign of slope m in multiplier block 1114 is reversed. F measure block 1110 outputs $F_{meas}$ 1132 to third summer 1112 if zone power control is used.

Power limits 834 include a $P_{max}$ set point 1134 of energy storage device 860 and a $P_{min}$ set point 1140 of energy storage device 860. Changing the limits $P_{max}$ and $P_{min}$ controls the width of window 1007 shown with reference to FIG. 10. Charging coordinator 858 controls the charge state of energy storage device 860 through the limits $P_{max}$ and $P_{min}$. First summer 1102 compares $P_{max}$ set point 1134 with $P_{meas}$ 838 to calculate a first power difference 1136 input to first PI controller 1104. For example, first summer 1102 subtracts $P_{meas}$ 838 from $P_{max}$ set point 1134. First PI controller 1104 controls the maximum power through a maximum frequency change 1138, $\Delta\omega_{max}$, that is limited between a minimum frequency and 0 Hz. In an exemplary embodiment, the minimum frequency is −1 Hz. Second summer 1106 compares $P_{min}$ set point 1140 with $P_{meas}$ 838 to calculate a second power difference 1142 input to second PI controller 1108. For example, second summer 1106 subtracts $P_{meas}$ 838 from $P_{min}$ set point 1140. Second PI controller 1108 controls the minimum power through a minimum frequency change 1144, $\Delta\omega_{min}$, that is limited between 0 Hz and a maximum frequency. In an exemplary embodiment, the maximum frequency is 1 Hz. $\Delta\omega_{max}$ and $\Delta\omega_{min}$ are scaled as radians for input to fifth summer 1118. Maximum frequency change 1138 and minimum frequency change 1144 maintain the flow set point within window 1007. In general, control parameters of the first and second PI controllers 1104, 1108 are set such that a steady state at a limit is reached in 10-20 cycles.

Third summer 1112 compares power set point 830 with power flow 1148 to calculate a third power difference 1150 input to multiplier 1114. For example, third summer 1112 subtracts power flow 1148 from power set point 830. Multiplier 1114 multiplies third power difference 1150 by the slope m to determine a frequency change 1152. Depending on the type of power control, frequency change 1152 may be defined as $m(F_o-F_{meas})$ or $-m(P_o-P_{meas})$. Fourth summer 1116 adds frequency set point 832 to frequency change 1152 to calculate an operating frequency 1154 input to fifth summer 1118. Fifth summer 1118 adds operating frequency 1154 with maximum frequency change 1138 and minimum frequency change 1144 to calculate a requested frequency 1156 input to integrator 1120. The output of the integrator 1120 is inverter phase angle 836, which is rotating in time at frequency $\omega_{req}$. Inverter phase angle 836 is reset to zero when it exceeds $2\pi$ radians.

With reference again to FIG. 8, charging coordinator 858 controls the rate of charge and discharge and the charge levels of energy storage device 860 by setting power limits 834 on P-ω droop controller 856. For example, if energy storage device 860 is fully charged, $P_{max}$ set point 1134 is set to zero, forcing the power set point 830 to match the effective load. Charging coordinator 858 can be implemented, for example, using a look up table or an analog circuit. Inputs to charging coordinator 858 include a charge level and a storage power 840 of energy storage device 860 and $P_{meas}$ 838 calculated by P-ω droop controller 856. The outputs are power limits 834 input to P-ω droop controller 856.

Control of energy storage device 860 utilizes two distinct parameters: 1) a storage power, $P_s$, that determines how fast energy can be extracted or injected into energy storage device 860, and 2) an energy level, $E_s$, that can be stored in energy storage device 860. The silicon devices in inverter 852 may have a thermal upper bound that limits the peak current capabilities to about 2 pu of their nominal rated value. The resulting peak current defines a parameter $\pm P_{peak}$. The output power from energy storage device 860 has a rating $P_{dis}$ based on its preferred discharge rate and a rating $P_{chg}$ based on its preferred charge rate. These maximum charge and discharge rates are used when the distribution system requires the highest available level of power. For example, when the system switches to island mode, the maximum discharge rate is needed until other microsources can provide the needed energy. Setting $P_{min}$ and $P_{max}$ in P-ω droop controller 856 enforces the required rate limits. For example, to fix the discharge rate at $P_{dis}$, $P_{min}$ and $P_{max}$ can be set to $P_{dis}$. As a result, the other microsources increase or decrease their output as the loads change. Alternatively, to fix the discharge rate at $P_{dis}$, $P_{max}$ can be set to $P_{dis}$. As a result, energy storage device 860 tracks load changes without exceeding the ideal discharge rate, $P_{dis}$.

Charging coordinator 858 also enforces energy levels to avoid overcharging energy storage device 860 and to ensure enough power supply to loads during island mode for a determined period of time. Again, these limits are enforced by $P_{min}$ and $P_{max}$. A minimum energy level $E_{min}$ corresponds with an energy level at which energy storage device 860 can only be charged because there is no available energy. A maximum energy level $E_{max}$ corresponds with an energy level at which energy storage device 860 can only be discharged because there is no available storage. A minimum reserve energy level $E_{min\_res}$ corresponds with the minimum reserve value of energy that energy storage device 860 maintains to provide short-term energy to loads during islanding. A maximum reserve energy level $E_{max\_res}$ corresponds with the maximum reserve value of energy that energy storage device 860 generally does not exceed except during a brief time in island operation.

Three main operating regions defined by $E_{min}$, $E_{max}$, $E_{min\_res}$, and $E_{max\_res}$ dictate the behavior of charging coordinator 858. In general, $E_{min}<E_{min\_res}<E_{max\_res}<$ and $E_{max}$. In a first storage region, between $E_{min\_res}$ and $E_{max\_res}$, the energy is considered within normal values. In a second storage region, between $E_{min}$ and $E_{min\_res}$, energy storage device 860 is normally charged to a level between $E_{min\_res}$ and $E_{max\_res}$, but can be discharged to balance power when islanding. In a third storage region, between $E_{max\_res}$ and $E_{max}$, energy storage device 860 is normally discharged to a level between $E_{min\_res}$ and $E_{max\_res}$, but can be charged to balance power when islanding.

Energy storage device 860 has high energy requirements to allow transfer of energy from low load periods to peak periods and high power requirements for load tracking and power quality needs. In general, if a battery is optimized for energy applications, recurring power demands, such as islanding or power quality events, tend to cause premature failure. Battery systems for bulk energy applications use such technologies as flow batteries and high-temperature batteries (such as sodium-sulfur and sodium-metal chloride). These need to be able to have continuous discharge over a specific time period. At the other end of the spectrum are uninterruptible power supply (UPS) systems or power battery applications, which demand high power discharge in seconds. To support both energy storage and power storage functions, a plurality of storage devices may be mounted in parallel. The rate of power change could be controlled using a ramp filter in P-ω droop controller 856, which controls the rate of change of the requested frequency 1156, and therefore, the rate of power change.

Given the technology restrictions for different types of batteries, fly wheels, super-capacitors, etc., different parameters in energy E and rate of power P are needed, which directly impacts the lifetime of the technology. For example, if an application displaces energy from night to daytime loads, the rate of power input and output should be very small. Alternatively, if an application is used in a power mode, a different storage system is needed to allow fast discharge, in several cycles, to meet loss of generation. For all applications and storage systems, changing the power limits $P_{min}$ and $P_{max}$ continuously controls the rate of charge or discharge of energy storage device 860.

Figure 12:
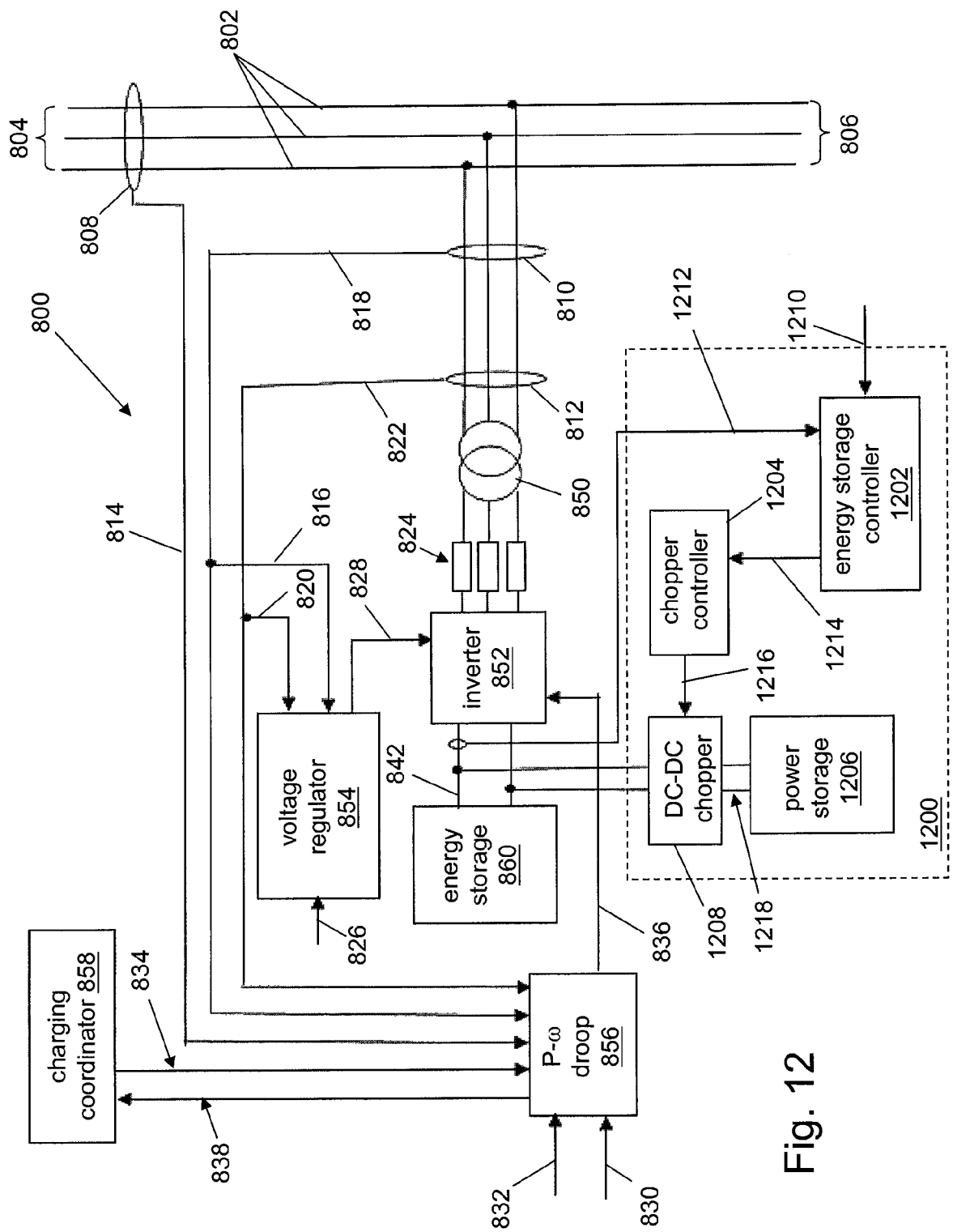
FIG. 12 is a block diagram of a combined energy and power storage control system for a distributed energy resource in accordance with an exemplary embodiment.

With reference to FIG. 12, a power storage system 1200 is connected to microsource system 800 in accordance with an exemplary embodiment to support high energy and high power requirements. Power storage system 1200 may include an energy storage controller 1202, a chopper controller 1204, a power storage device 1206, and a DC-DC chopper 1208. Power storage system 1200 connects to DC bus 842 between energy storage device 860 and inverter 852 through DC-DC chopper 1208. Power storage system 1200 provides a fast rate of energy, generally <1 second, to inverter 852. Energy storage controller 1202 controls the rate of discharge of energy storage device 860 by measuring a DC current 1212 drawn by inverter 852 from energy storage device 860. Energy storage controller 1202 further receives a ramp rate 1210 as an input to calculate an output current 1214. Output current 1214 is input to chopper controller 1204 as an injected current reference which holds the power rate from energy storage device 860 to a maximum power ramp rate.

Control of energy storage device 860 and power storage device 1206 is coordinated through various input parameters. The basic coordination is through the rate of charge or discharge. The discharge rate is provided by ramp rate 1210 through the energy storage controller. The charge rate is controlled by the limits provided by the charging coordinator 858. Additionally, ramp rate 1210 may reduce the need for continually changing the power limits input to P-ω droop controller 856 and may remove the need to enforce a rate limit on inverter 852. The amount of power stored at power storage device 1206 may be dictated by the amount of power required to make up the difference between what is needed by inverter 852 and what can be provided by energy storage device 860.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A controller for controlling a charge and/or a discharge of an energy storage device used in a distributed energy resource, the controller comprising circuitry:
   to calculate a maximum frequency change for an inverter based on a first comparison between a first power set point and a measured power from the inverter, wherein the first power set point is defined based on a charge level of an energy storage device coupled to the inverter;
   to calculate a minimum frequency change for the inverter based on a second comparison between a second power set point and the measured power from the inverter;
   to calculate an operating frequency for the inverter based on a third comparison between a power set point and a measured power flow;
   to calculate a requested frequency for the inverter by combining the calculated maximum frequency change, the calculated minimum frequency change, and the calculated operating frequency; and
   to integrate the calculated requested frequency to determine a phase angle of a voltage of the inverter to control a frequency of an output power of the inverter.

2. The controller of claim 1, wherein calculating the operating frequency comprises use of $m(F_o-F)$, where m is a slope of an F-$\omega$ characteristic, $_o$ is the power set point, and F is the measured power flow.

3. The controller of claim 1, wherein calculating the operating frequency comprises use of $m(P_o-P)$, where m is a slope of a P-$\omega$ characteristic, $P_o$ is the power set point, and P is the measured power flow.

4. The controller of claim 3, wherein the measured power is the measured power flow.

5. The controller of claim 1, wherein calculating the maximum frequency change comprises subtracting the measured power from the first power set point to determine a power differential.

6. The controller of claim 5, wherein calculating the maximum frequency change further comprises applying the determined power differential to a proportional-integral controller.

7. The controller of claim 1, wherein calculating the minimum frequency change comprises subtracting the measured power from the second power set point to determine a power differential.

8. The controller of claim 7, wherein calculating the minimum frequency change further comprises applying the determined power differential to a proportional-integral controller.

9. The controller of claim 1, wherein the second power set point is defined based on the charge level of the energy storage device.

10. The controller of claim 1, further comprising regulating an output voltage of the inverter using a voltage versus reactive power droop controller.

11. The controller of claim 1, wherein the first power set point is set to a maximum discharge rate of the energy storage device during a transition to island mode.

12. The controller of claim 1, wherein the first power set point is set to a preferred discharge rate of the energy storage device after a transition to island mode.

13. The controller of claim 12, wherein the second power set point is set to the preferred discharge rate of the energy storage device after the transition to island mode.

14. The controller of claim 1, wherein the first power set point is set to a preferred discharge rate of the energy storage device when an energy level of the energy storage device exceeds a maximum energy reserve level.

15. The controller of claim 1, wherein the first power set point is set to approximately zero when an energy level of the energy storage device falls below a minimum energy reserve level.

16. The controller of claim 1, further comprising measuring a current drawn by the inverter from the energy storage device.

17. The controller of claim 16, further comprising holding a power rate from the energy storage device to a maximum power ramp rate.

18. A method of controlling a charge and/or a discharge of an energy storage device used in a distributed energy resource, the method comprising:
   calculating a maximum frequency change for an inverter using a controller based on a first comparison between a first power set point and a measured power from the inverter, wherein the first power set point is defined based on a charge level of an energy storage device coupled to the inverter;
   calculating a minimum frequency change for the inverter using the controller based on a second comparison between a second power set point and the measured power from the inverter;
   calculating an operating frequency for the inverter using the controller based on a third comparison between a power set point and a measured power flow;
   calculating a requested frequency for the inverter using the controller by combining the calculated maximum frequency change, the calculated minimum frequency change, and the calculated operating frequency; and
   integrating the calculated requested frequency to determine a phase angle of a voltage of the inverter to control a frequency of an output power of the inverter.

19. A microsource, the microsource comprising:
   an inverter;
   an energy storage device operably coupled with the inverter; and
   a controller operably coupled with the energy storage device and the inverter, the controller including circuitry configured
   to calculate a maximum frequency change for the inverter based on a first comparison between a first power set point and a measured power from the inverter, wherein the first power set point is defined based on a charge level of the energy storage device;
   to calculate a minimum frequency change for the inverter based on a second comparison between a second power set point and the measured power from the inverter;
   to calculate an operating frequency for the inverter based on a third comparison between a power set point and a measured power flow;

to calculate a requested frequency for the inverter by combining the calculated maximum frequency change, the calculated minimum frequency change, and the calculated operating frequency; and to integrate the calculated requested frequency to determine a phase angle of a voltage of the inverter to control a frequency of an output power of the inverter.

20. The microsource of claim 19, further comprising a power storage device operably coupled with the inverter, wherein the controller is operably coupled with the power storage device and further includes circuitry configured to limit a power rate of the energy storage device and to control an amount of power output from the power storage device to the inverter.

21. The microsource of claim 20, wherein the controller further includes circuitry configured to measure a current drawn by the inverter from the energy storage device to limit the power rate of the energy storage device.

* * * * *

UNITED STATES PATENT AND TRADEMARK OFFICE
CERTIFICATE OF CORRECTION

PATENT NO. : 7,787,272 B2  Page 1 of 1
APPLICATION NO. : 11/681024
DATED : August 31, 2010
INVENTOR(S) : Robert H. Lasseter It is certified that error appears in the above-identified patent and that said Letters Patent is hereby corrected as shown below:

Col. 1; lines 7-11, please delete the paragraph reciting

"This invention was made with United States government support awarded by the following agencies: National Science Foundation, Electrical & Communications System Div., Award No. 0078522. The United States government has certain rights in this invention."

under the header REFERENCE TO GOVERNMENT RIGHTS and replace with the following rewritten paragraph:

--This invention was made with government support under DE-AC03-76SF00098 awarded by the US Department of Energy. The government has certain rights in the invention.--

Signed and Sealed this

Nineteenth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,787,272 B2
APPLICATION NO. : 11/681024
DATED : August 31, 2010
INVENTOR(S) : Robert H. Lasseter et al.

It is certified that error appears in the above-identified patent and that said Letters Patent is hereby corrected as shown below:

At Col. 1; line 43 please delete the phrase reciting

"$_o$ is the power set point"

and replace with the following rewritten phrase:

--$F_o$ is the power set point--

Signed and Sealed this
Twenty-fifth Day of January, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,787,272 B2 | Page 1 of 1 |
| APPLICATION NO. | : 11/681024 | |
| DATED | : August 31, 2010 | |
| INVENTOR(S) | : Robert H. Lasseter et al. | |

It is certified that error appears in the above-identified patent and that said Letters Patent is hereby corrected as shown below:

IN THE CLAIMS

Col. 13, Line 43 (Claim 2):
Delete "$_o$ is the power set point" and replace with -- $F_o$ is the power set point --

Signed and Sealed this
Twenty-eighth Day of August, 2012

David J. Kappos
*Director of the United States Patent and Trademark Office*